United States Patent [19]

Shimanaka

[11] Patent Number: 5,033,328
[45] Date of Patent: Jul. 23, 1991

[54] POWER TRAIN CONTROL SENSOR MALFUNCTION DETECTION AND CONTROL ARRANGEMENT

[75] Inventor: Shigeki Shimanaka, Hadano, Japan

[73] Assignee: Nissan Motor Co., Ltd., Yokohama, Japan

[21] Appl. No.: 387,273

[22] Filed: Jul. 31, 1989

[30] Foreign Application Priority Data

Aug. 1, 1988 [JP] Japan .................. 63-190534

[51] Int. Cl.$^5$ ............................................. F16H 61/12
[52] U.S. Cl. ................................. 74/866; 364/424.1
[58] Field of Search ............ 74/866, 851, 872, 858; 364/424.1

[56] References Cited

U.S. PATENT DOCUMENTS

| 4,266,447 | 5/1981 | Heess et al. ........................ 74/858 |
| 4,355,550 | 10/1982 | Wiu et al. ....................... 74/866 X |
| 4,393,732 | 7/1983 | Suzuki et al. ...................... 74/866 |
| 4,403,527 | 9/1983 | Mohl et al. ...................... 74/866 X |
| 4,635,508 | 1/1987 | Tatsumi ............................. 74/866 |
| 4,680,988 | 7/1987 | Mori ........................... 364/424.1 X |
| 4,685,051 | 8/1987 | Hattori et al. ................... 74/866 X |
| 4,691,285 | 9/1987 | Takeda ............................. 74/866 |
| 4,744,031 | 5/1988 | Takeda et al. .................. 364/424.1 |
| 4,858,499 | 8/1989 | Ito et al. .......................... 74/866 |
| 4,896,569 | 1/1990 | Ito et al. .......................... 74/866 |
| 4,969,099 | 11/1990 | Iwatsuki et al. .................. 74/866 |

FOREIGN PATENT DOCUMENTS 58-77138  5/1983  Japan .
62-88624  4/1987  Japan .

OTHER PUBLICATIONS

Nissan Full-Range Automatic Transmission RE4R01A Type, Service Manual, (A261C07) issued on Mar. 1987 by Nissan Motor Company Limited. (Not Translated).

Primary Examiner—Allan D. Herrmann
Assistant Examiner—Khoi Q. Ta
Attorney, Agent, or Firm—Foley & Lardner

[57] ABSTRACT

A power train control system includes circuitry which, during the delay between the issuance of a shift command signal and the actual initiation of shift and/or during non-shifting modes of operation, monitors the outputs of sensors. If the sensors are found to be out of order, steps are subsequently taken to inhibit prime mover torque variation so as to avoid erroneous shock attenation control. The line pressure is controlled in accordance with the presence or absence of a torque variation signal to provide an improved match between the engine torque and transmission line pressure controls.

4 Claims, 6 Drawing Sheets

5,033,328

POWER TRAIN CONTROL SENSOR MALFUNCTION DETECTION AND CONTROL ARRANGEMENT

BACKGROUND OF THE INVENTION

1. Field of the Invention

The present invention to a power train which includes a prime mover in the form of an engine and a transmission which is operatively connected therewith and more specifically to a shift shock attenuation arrangement which varies the amount of torque produced by the engine during shifts and which features a sensor malfunction diagnostic function.

2. Description of the Prior Art

JP-A-58-77138 discloses an arrangement which sought to reduce shift shock by selectively varying the torque output of the prime mover during periods when the transmission is undergoing a shift.

However, this arrangement has proven only partially effective in that in the event of a sensor malfunction the shock attenuation function tends to be lost completely.

JP-A-62-88624 discloses an arrangement wherein in the event that one of an engine speed sensor, a throttle position sensor, a transmission output shaft rotational speed sensor and a torque converter turbine shaft rotational speed sensor, malfunctions, the sensor outputs are not used and the shift decision and engine torque variation control are generated in accordance with a timer.

However, this control tends to deteriorate shift shock attenuation and further tends to increase the rate of wear of the friction elements.

SUMMARY OF THE INVENTION

Accordingly, it is an object of the present invention to provide a system wherein, during the delay between the issuance of shift command signal and the actual initiation of the shift and/or during non-shifting modes of operation, the outputs of the sensors are monitored and if found to be out of order steps are subsequently taken to inhibit prime mover torque variation so as to avoid erroneous shock attenuation control.

A further object of the present invention is to control the line pressure in accordance with the generation of a torque variation signal and thus improve the generation of shift shock and or friction element slippage by providing an improved match between the torque and line pressure controls.

In more specific terms a first aspect of the present invention is deemed to comprise a power train including an engine and a transmission which is operatively connected with the engine, said transmission including a plurality of friction elements which can be selectively supplied with line pressure in a manner to switch the transmission from one gear ratio to another, said transmission including a unit for producing a decision to switch from one gear ratio to another, a plurality of sensors which are used to determine the time from the initiation of the shift to the completion thereof, and a unit for producing a torque reduction signal which induces a reduction in the torque produced by the engine during shifting to reduce shift shock, the arrangement featuring: a unit for monitoring the outputs of the sensors and for determining the presence of a malfunction therein; and a unit for inhibiting the generation of the torque reduction signal in the presence of a malfunction.

A second aspect of the present invention is deemed to comprise a power train including an engine and a transmission which is operatively connected with the engine, said transmission including a plurality of friction elements which can be selectively supplied with line pressure in a manner to switch the transmission from one gear ratio to another, the arrangement featuring: a unit for producing a decision to switch from one gear ratio to another; a plurality of sensors which are used to determine the time from the initiation of the shift to the completion thereof; a unit for producing a torque variation signal, the torque reduction signal being applied to induce a reduction in the torque produced by the engine during shifting to reduce shift shock; a unit for monitoring the outputs of the sensors and for determining the presence of a malfunction therein; and a unit for inhibiting the generation of the torque variation signal in the presence of a malfunction.

A third aspect of the present invention is deemed to comprise a power train which features: an engine; an engine speed sensor; an engine load sensor; an engine control unit, the engine control unit being connected with the engine speed sensor and the engine load sensor and arranged to control the torque produced by the engine; a transmission operatively connected to the engine, the transmission having an input shaft and an output shaft, the transmission including a source of line pressure and plurality of friction elements which can be induced to engage via the selective supply of line pressure thereto in a manner to produce a plurality of different gear ratios, and a control valve assembly, said control valve assembly including a valve which controls the level of the line pressure which is supplied to the friction elements; a transmission output shaft rotational speed sensor for sensing the rotational speed of the transmission; a transmission control unit, the engine control unit being connected with the transmission output shaft rotational speed sensor and the engine load sensor, the control unit including: a unit for generating an engine torque variation signal and supplying the engine torque variation signal to the engine control unit; a memory in which line pressure control data is prestored, the control data including a first line pressure schedule for use when the torque variation signal is generated and a second line pressure control schedule for use when the torque variation signal is absent; a unit for monitoring the outputs of the engine speed load sensor and the transmission output shaft rotational speed sensor and for diagnosing sensor malfunction; and a unit for inhibiting the generation of the torque variation signal when the monitoring unit indicates a sensor malfunction has occurred.

DETAILED DESCRIPTION OF THE PREFERRED EMBODIMENTS

Figure 1:
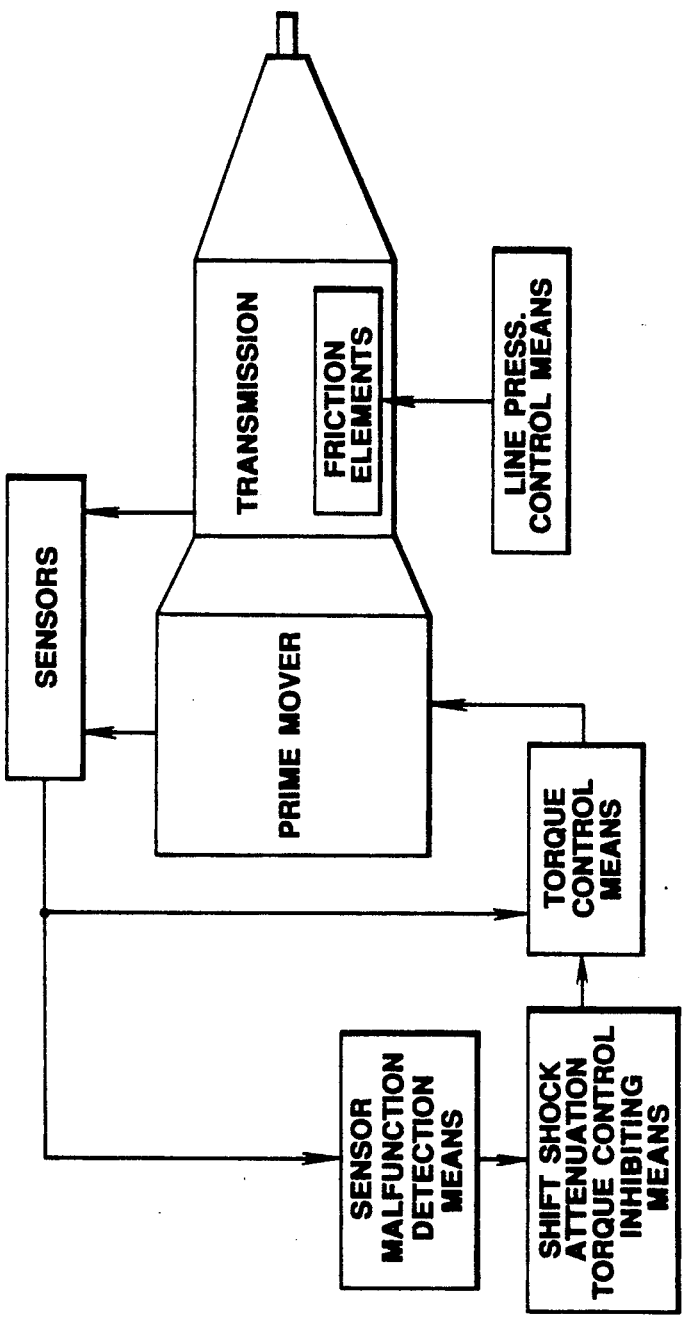
FIGS. 1 and 2 are block diagrams which illustrate the conceptual arrangements which characterize the first and second embodiments of the present invention.
Figure 2:
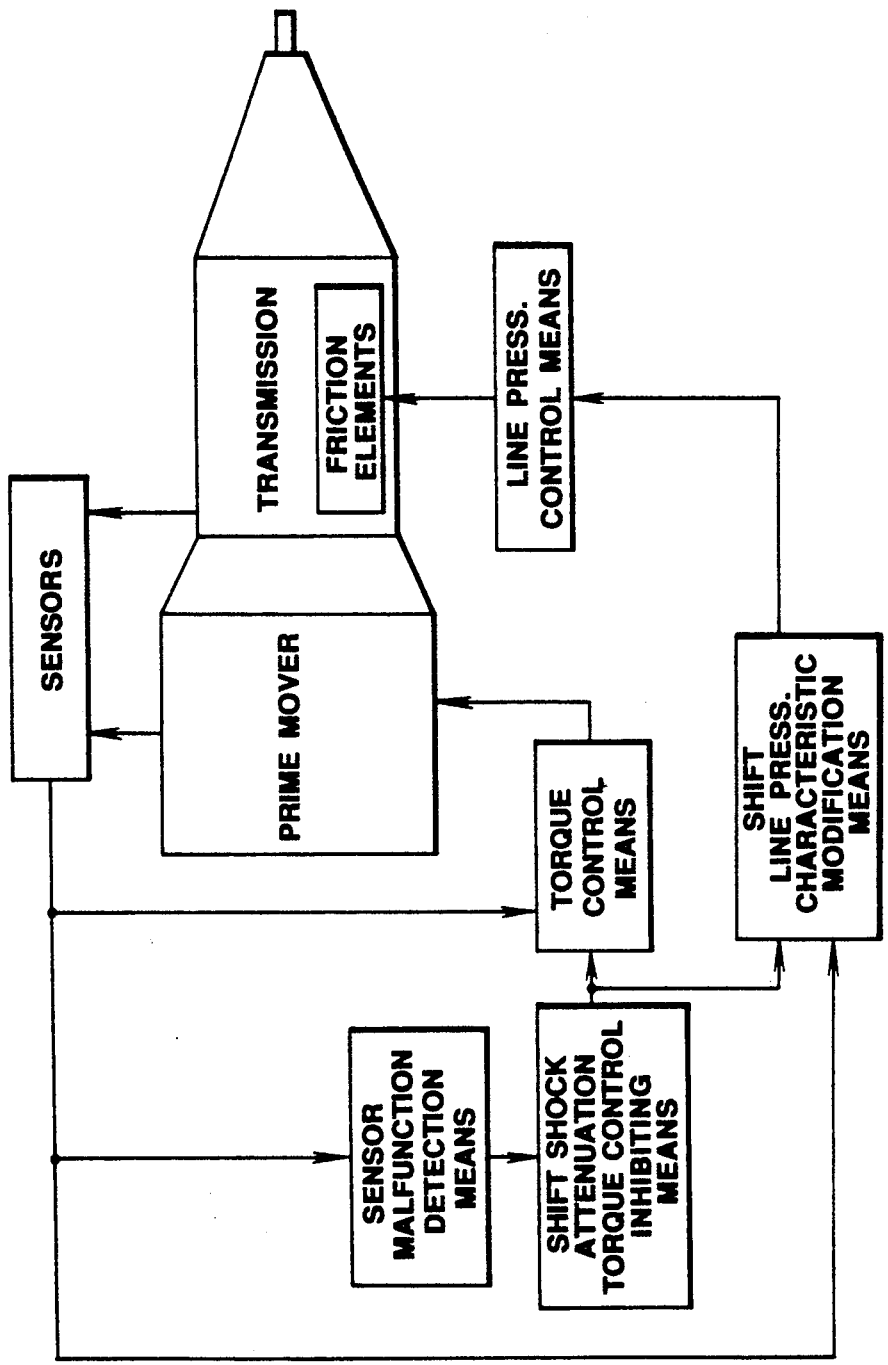
Figure 3:
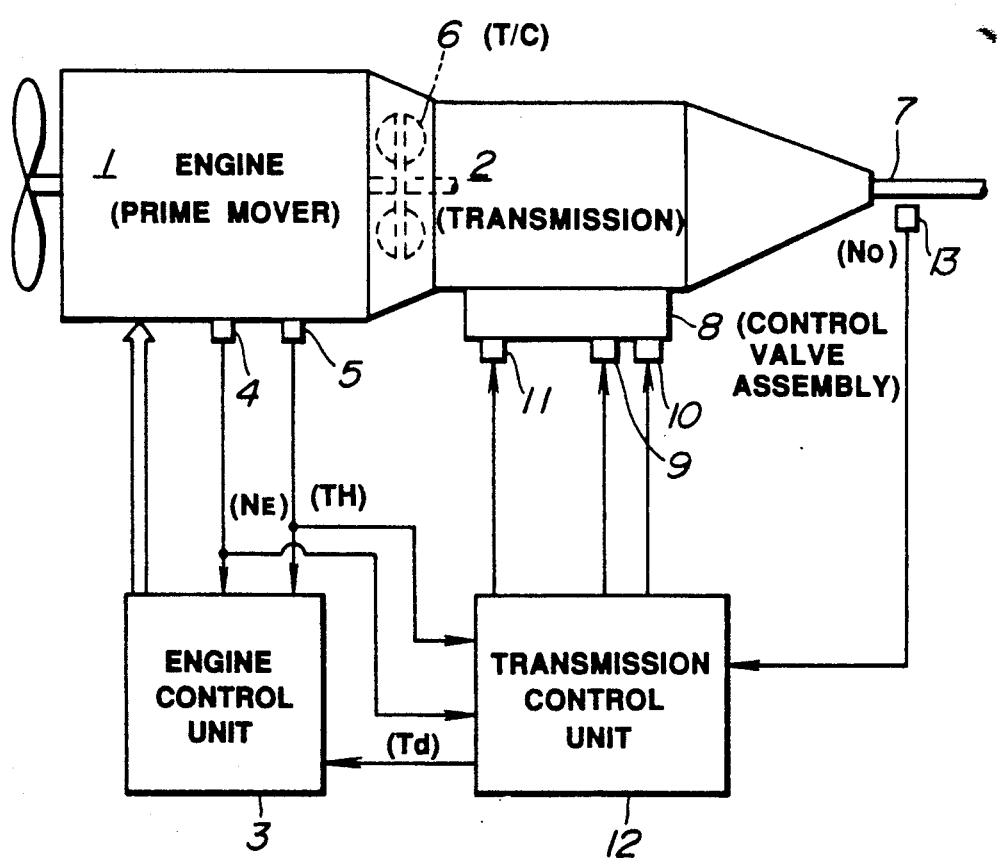
FIGS. 3 and 5 are schematic diagram showing engine systems to which the embodiments of the present invention are respectively applicable.

FIG. 3 shows a power train to which a first embodiment of the present invention is applied. In this arrangement an electronically fuel injected internal combustion engine 1 is operatively connected by way of a torque converter 6 to a transmission 2.

Figure 5:
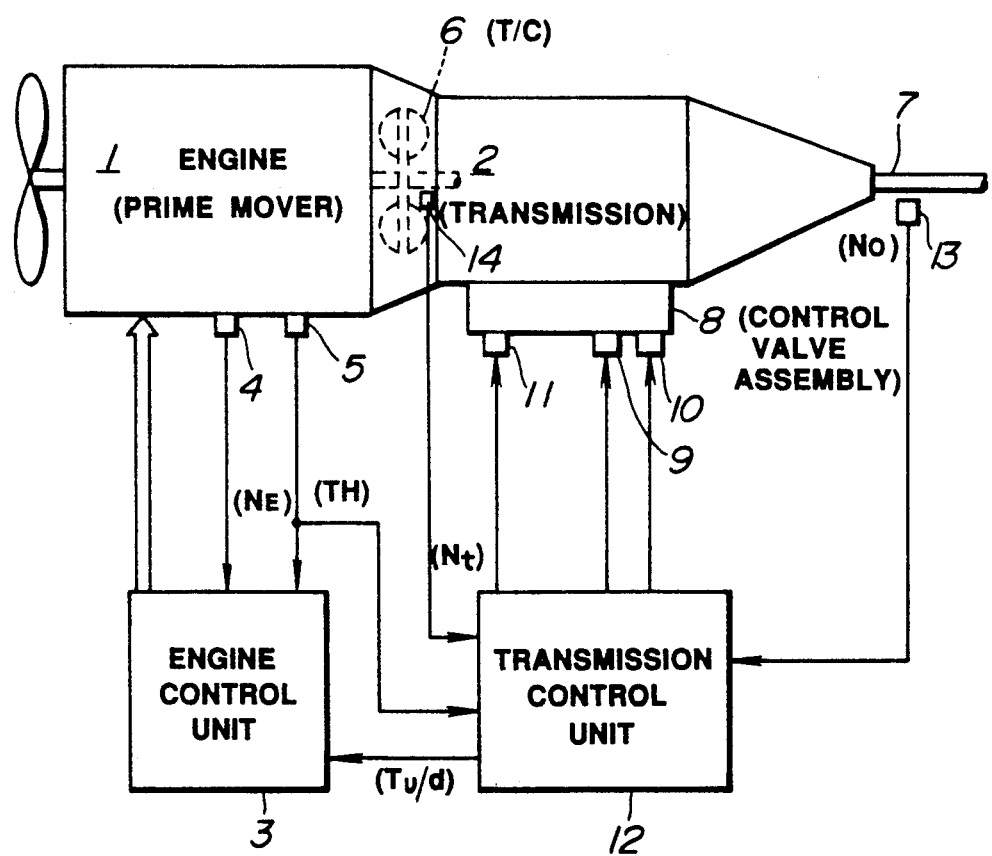

It should be understood that even though FIG. 5 shows a F-R type power train (front engine - rear wheel drive) the present invention is not limited to the same and can be applied to FF, MR or four-wheel drive 4WD type arrangements if so desired.

The engine control system includes an engine control unit 3 which is supplied inputs from an engine speed sensor 4 and a throttle position sensor 5. Based on the inputs of sensors 4 and 5, the engine control unit 3 which in this instance includes a microprocessor (not shown), derives the appropriate injection control pulse width and applies the same to the fuel supply system of the engine.

In this embodiment, the transmission 2 comprises (merely by way of example) a RE4RO1A type transmission developed by NISSAN MOTOR CO. LTD., the construction and arrangement of which is described in detail in the Service Manual A261CO7 published by the above mentioned company.

A transmission output shaft 7 provides a drive connection between the differential or final gear (not shown) and the transmission.

The transmission is provided with a transmission control unit 12 which also includes a microprocessor. This unit 12 is arranged to issue control signals to a control valve assembly 8 which forms part of the transmission. The control valve assembly 10 includes three solenoids 9, 10 and 11.

In this embodiment the transmission includes a gear train comprising a plurality of planetary gear units, and associated hydraulically operated clutches and brakes (not shown). The brakes and clutches are operated by the supply of line pressure which is selectively supplied from the control valve assembly 8.

Depending on the energization of solenoids 9 and 10, the transmission is conditioned to selectively produce a number of different gear ratios by selectively inducing line pressure to be supplied to the appropriate friction elements.

In this instant arrangement four forward gear ratios of the transmission can be produced in the manner indicated in the following table.

TABLE 1

| GEAR: | FIRST | SECOND | THIRD | FOURTH |
|---|---|---|---|---|
| SOL. 9: | ON | OFF | OFF | ON |
| SOL. 10 | ON | ON | OFF | OFF |

The third solenoid 11 of the control valve unit 8 is arranged to be operated on a variable duty cycle and to control the level of the line pressure.

The transmission control unit 12 is arranged to receive a data input No from a rotational speed sensor 13. As will be appreciated from the drawings, No is indicative of the rotational speed of the transmission output shaft 7. The transmission control unit 12 is further arranged to receive data inputs from the engine speed sensor 4 and the throttle position (engine load) sensor 5.

Based on the data input from the above mentioned sensors the transmission control unit 12 outputs suitable control signals to the solenoids 9, 10 and 11. This unit further derives and outputs a torque variation control signal Td (in this case a torque reduction or so called "torque down" signal) to the engine control unit 3.

In response to this torque down signal the engine control unit can reduce the amount of fuel supplied to the engine by cutting the supply to selected cylinders for example or by modifying the ignition timing. For further information relating to techniques of implementing the above described torque down control, reference may be had to U.S. Pat. No. 4,266,447 which was issued on May 12, 1981 in the name of Heess et al.

Figure 6:
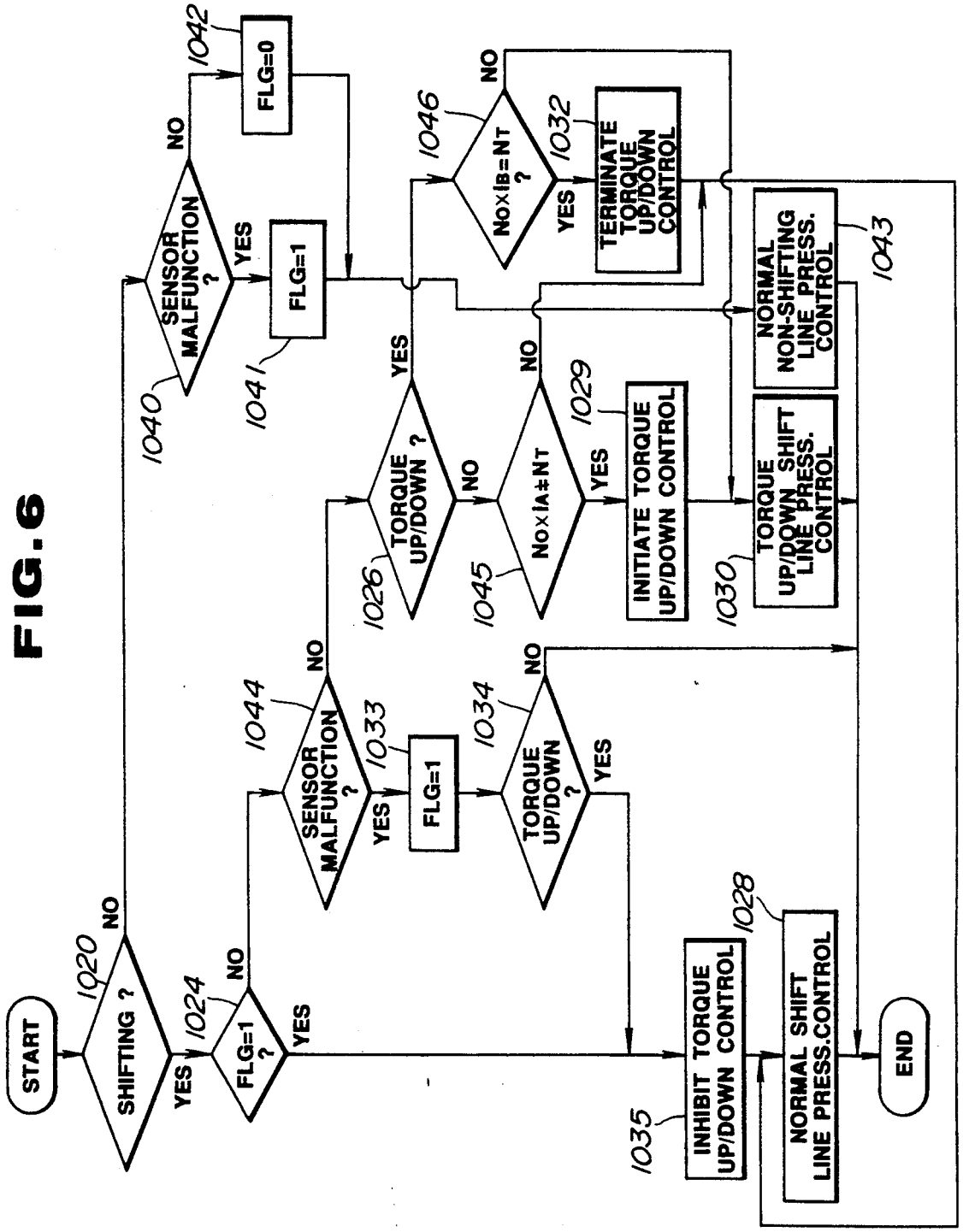

FIG. 6 depicts in flow chart form, a routine which is run in a microprocessor included in the transmission control unit and which performs or inhibits the performance of a line pressure level self-adjust function. In this particular routine the self-update is performed in accordance with the reduction of engine speed during upshifts only.

The reason for this is that it has been found that a reliable correlation between the inertia shift time of an upshift and the level of line pressure can be expected. Hence, by comparing the actual inertia phase time with a time which occurs when the line pressure is at an optimal level, it is possible to use the difference in the times as a parameter by which the line pressure changed. This tends to compensate for wear in the friction elements the changes in the engagement characteristics which tend to occur with change in working fluid temperature and/or the unit to unit deviations which inevitably occur between the friction elements and solenoid valve units.

However, as the self adjust system is totally dependent on the accuracy of the data supplied by the sensor or sensors utilized, this particular embodiment of the present invention includes a step for subjecting the outputs of the same to diagnostic checking. If the sensor or sensors are found to be supplying data indicative of normal malfunction free operation, the routine flows through steps which enable the self-adjust function. However, if the received data is indicative of a sensor malfunction then the self-adjust function is inhibited.

Figure 4:
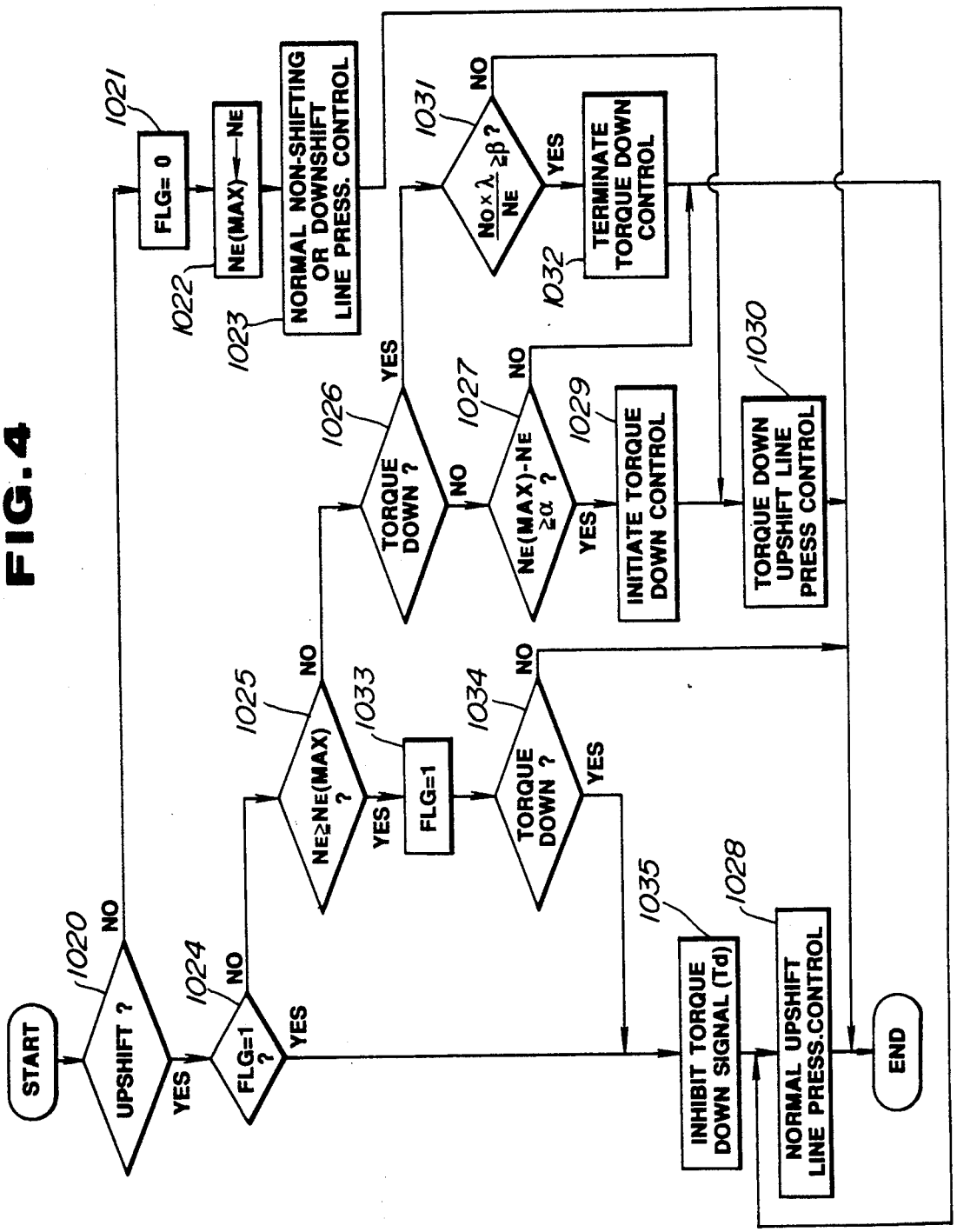
FIGS. 4 and 6 are flow charts depicting the steps which characterize routines which perform torque variation and torque variation inhibit functions in accordance with engine speed and transmission output shaft rotational speed input data.

In more detail the first step 1020 of the routine shown in FIG. 4 is such as to determine if the transmission is undergoing an upshift or not. This decision can be made by sampling decisions made by a shift control routine which utilizes vehicle speed and engine load and which compares the instant gear with that which is indicated by the instant speed and load levels in order to determined which shift should be made and via which particular resetting of the shift solenoid settings, the required shift can be put into effect.

For further details concerning the above type of shift control routine and the manner which which such decisions are made, reference can be had to copending U.S. patent application Ser. No. 07/330,129 filed on Mar. 29, 1989 in the name of Narita. The content of this document is hereby incorporated by reference thereto.

In brief, this document discloses an arrangement wherein the states of two solenoids which control four forward gears of a transmission, are toggled between ON and OFF states in response to the outcome of a comparative ranging of a ratio developed by comparing the rotational speeds of the input and output gears with limits derived from pre-recorded data. In the case of a power ON upshift data which is recorded in terms of throttle opening is used. On the other hand, when a power OFF upshift is induced by releasing the vehicle accelerator pedal, data which is recorded in terms of vehicle speed is used to set the limits.

In the event that the transmission is found to be not undergoing an upshift in step 1020, the routine flows to step 1021 wherein a sensor malfunction flag is cleared (viz., FLG=0) and at step 1022 the instant engine speed is read and stored in memory as the current Ne(MAX) value. This value is used in connection with the sensor malfunction determination as will become more apparent hereinafter.

Following this, at step 1023 normal non-shifting or downshifting line pressure control routines are run and the routine ends.

On the other hand, if the transmission is found to be undergoing an upshift, then at step 1024 the status of the sensor malfunction flag is checked and in the event that it is not set then the routine flows to step 1025 where the instant engine speed value Ne is read and compared with the value of Ne(MAX) recorded in step 1022. If Ne<Ne(MAX) then it is assumed that the engine speed sensor is functioning properly and the routine flows to step 1026 wherein it is determined if a torque reduction or "torque down" signal Td is currently being issued to the engine control unit 3.

In the event that a torque down signal Td is not being issued, then the routine flows to step 1027 wherein the difference between the value of Ne(MAX) and the instant engine speed Ne is compared with a predetermined value $\alpha$. In the event that the difference is found to be greater or equal to $\alpha$ then it is deemed that the upshifting operation has actually been initiated and at step 1029 a command to begin generating the torque reduction signal Td is issued. Following this at step 1030, a sub-routine or routines which are required to control the level of line pressure to that desired for the instant upshift are run and the routine ends. This sub-routine can include reading out of memory a line pressure control solenoid duty cycle which has been designed to induce a level of line pressure which is matched to the amount of torque which will be produced by the engine under the torque down control.

Although not essential to the instant invention, it is within the scope of the same to include a self adjust-function in step 1030. That is to say, in addition to reading a suitable duty cycle to be applied to the line pressure solenoid 11 during the instant shift, it is further possible to start a shift timer at the time the torque down signal is issued and to stop it when the issuance of the signal is terminated (step 1032). By comparing this time with a predetermined one indicative of an optimal line pressure level, it is possible to modify the duty cycle of the signal which is applied to the line pressure valve during the next run of the routine in a manner which tends to reduce the difference between the two times to zero and therefore tends to optimize the line pressure level applied under torque down conditions.

For further information relating to this particular facet of control reference may be had to copending U.S. patent application Ser. No. (not yet available) filed concurrently with the instant application in the name of Shimanaka and which claimed priority based on Japanese Patent Application No. 63-190532. The content of this document is hereby incorporated by reference thereto.

In brief, this document discloses an arrangement wherein the outputs of one or more the sensors involved in the control of the transmission line pressure level are monitored. In the event that one of the same exhibits characteristics indicative that it is malfunctioning, a self-update function which modifies the line pressure level based on the length of a shift time is inhibited in order to prevent the line pressure being adjusted in a totally erroneous manner.

On the other hand, if the outcome of the comparison of Ne(MAX)−Ne and $\alpha$ in step 1027 is such as to indicate that the difference is not yet equal to or greater than $\alpha$ then the routine flows around to step 1028 wherein normal upshift line pressure control is induced. In this step line pressure control solenoid duty cycle values suited for the instant set of operating conditions wherein engine torque is not being temporarily reduced, are read out of memory and used to determined the control signal which is applied to the line pressure control solenoid 11.

However, once the generation of the torque down signal is initiated in step 1029, the routine flows from step 1026 step 1031 wherein the engine speed Ne and transmission output shaft rotational speed No are monitored. Until No×1/Ne equals or exceeds a predetermined value $\beta$ the shift is not deemed to have been completed and the routine loops around to step 1030. Upon $\beta$ being reached or exceeded, the routine firstly flows to step 1032 wherein a command to terminate the issuance of the torque down signal Td is issued and then goes to end via step 1028.

In the event that the comparison of the instant engine speed value Ne and the Ne(MAX) value recorded in step 1022 is such as to indicate that Ne≧Ne(MAX) then it is deemed that the engine speed sensor is malfunctioning and the routine sets the sensor malfunction flag FLG (i.e. FLG=1). Following this it is determined if the torque down signal Td signal is being generated or not (step 1034).

In the event that the signal is not being generated the routine goes to end. However, if the signal Td is being generated then at step 1035 it is stopped and inhibited from being generated as long as FLG=1.

FIG. 5 shows an engine system to which a second embodiment of the present invention is applied. In this arrangement the engine speed signal Ne is supplied only to the engine control unit 3 and a transmission input shaft rotational speed sensor 14 provided. The output of this sensor Nt is supplied to the transmission control unit 12 in place of the engine speed data.

The control provided by the second embodiment is not limited to the upshifting and is applied to downshifting as well. Further, both torque increase as well as torque reduction control signals are issued to the engine control unit 3. Note that in this figure these signals are denoted by the same symbol (Tu/d).

FIG. 6 depicts the steps which characterize the control routine which is run in accordance with the second embodiment. In this flow chart the steps which correspond to those shown in FIG. 4 are denoted by the same numerals which those and differ bear numerals which begin with 1040.

The first step 1020 of this routine, although bearing the same numeral as that used in FIG. 4, differs in that the presence of any kind of shift is checked. If either an upshift or a downshift is taking place or a command for either has been issued, then the routine flows to step 1040 wherein diagnostic sub-routines are run in order to determine if any one of sensors 5, 13 or 14 is producing an output indicative of abnormal or improper operation. In the case of the engine speed sensor, a comparison of the instant engine speed with that recorded just before the issuance of a shift command and with the transmission operating in a non-shift mode, can be used in a manner similar to that shown in the flow chart of FIG. 4. The manner in which the outputs of the other sensors can be diagnostically checked vary and will be obvious to those skilled in the art to which the instant invention pertains.

For example, although the instant embodiment is shown not shown receiving the engine speed input per se, it is possible to compare the engine speed input with that of the transmission input shaft rotational speed sensor. As these two parameters tend to be the same during non-shifting modes and to parallel one another during upshifting, by way of example, if the difference between the two becomes excessive then one of the two may be deemed to have malfunctioned. Alternatively, and/or if both should fail this can be detected by noting the instant gear the transmission is currently conditioned to produce and comparing the output of the transmission output shaft with the rotational speed of the input shaft and/or engine speed during non-shifting modes.

As the output of the throttle valve position sensor 5 has a marked effect on the shifting while the engine speed (and the transmission input shaft rotational speed) is determined by the position of the throttle valve per se, a number of different comparisons are available for determining the proper operation of the sensors involved.

In the event that step 1040 indicates that one of the sensors involved in supplying data to the transmission control unit is operating in a manner indicative of a malfunction, then at step 1041 FLG is set. On the other hand if the all of the sensors are given a clean bill of health then at step 1042 FLG is cleared.

At step 1043 normal non-shifting line pressure line pressure control sub-routines are run and the routine ends.

In the event that step 1020 indicates that a shift has been commanded or is actually in progress, the routine flows to step 1024 to determine if a malfunction has been detected during non-shift modes of transmission operation. If all of the sensors have been declared operative, then the routine flows to step 1044 wherein the outputs of the sensors are subject to further examination. In this case as the transmission will (viz., a shift command has been issued) or is undergoing a shift, a variation in the comparative techniques for determining the operability of any one of the sensors occurs. For example, the outputs of the transmission input and output shafts can be compared with reference to the gear ratios between which the shift is being made, the rate of change of input rotational speed can be monitored etc.

In the event that all of the sensors are found to be operating properly, then the routine flows to step 1026 while in the event that one of the sensors is deemed suspect the routine goes to step 1033 and sets the sensor malfunction flag FLG. At step 1034 the presence or absence of torque variation signal generation is checked. If the Tu/d signal is not being supplied to the engine control unit 3 then the routine goes to end. On the other hand, if a Tu/d signal is being generated, the routine flows across to step 1035 to inhibit the same.

Step 1028 is such as to implement normal shift line pressure control while in step 1030 line pressure which is matched to the instant torque variation, is implemented.

Step 1045 is such as to monitor the rotational speeds of the input and output shafts of the transmission and to determine that a shift operation has actually initiated when the product of No (output shaft rotational speed) and iA (a value indicative of the gear ratio from the instant shift is being made) no longer agrees with the rotational speed of the input shaft Nt.

In the event that a shift initiation is detected, the routine flows to step 1029 wherein the appropriate torque up or torque down signal is generated.

At step 1046 the decision that the shift has been completed is made when the product of No and a value iB which is indicative of the gear ratio which will be produced following the completion of the instant shift, becomes equal to the input shaft rotational speed Nt. When $No \times iB = Nt$ the routine flows to step 1032 and terminates the generation of the torque variation signal and then loops to step 1028.

It is deemed within the scope of the present invention to control the torque varation in a manner such as disclosed in copending U.S. patent application (USN not yet available) filed on June 2, 1989 in the name of Kenji IKEURA and which claimed priority based on Japanese Patent Application No. 63-136910. This document is hereby incorporated by reference thereto.

In brief, this document discloses a shift shock or jolt control wherein the amount of engine intake air is increased and the ignition timing retarded to compensate for any undesired variation in transmission output during shifting operations.

What is claimed is:

1. In a power train including an engine and a transmission which is operatively connected with said engine, said transmission including a plurality of friction elements which can be selectively supplied with line pressure in a manner to switch said transmission from one gear ratio to another, said transmission including means for producing a decision to switch from one gear ratio to another, a plurality of sensors which are used to determine a time from an initiation of a shift to the completion thereof, and means for producing a torque reduction signal which induces a reduction in torque produced by said engine during shifting to reduce shift shock, an arrangement comprising:

means for monitoring outputs of said sensors and for determining a presence of a malfunction therein; and means for inhibiting generation of said torque reduction signal during a transmission shift in the presence of a malfunction.

2. A power train as claimed in claim 1 further comprising means for changing line pressure control characteristics when said torque reduction signal generation is inhibited and said transmission is undergoing a shift.

3. In a power train including an engine and a transmission which is operatively connected with said engine, said transmission including a plurality of friction elements which can be selectively supplied with line pressure in a manner to switch said transmission from one gear ratio to another, an arrangement comprising:

means for producing a decision to switch from one gear ratio to another;

a plurality of sensors which are used to determine a time from an initiation of a shift to a completion thereof;

means for producing a torque variation signal which induces a reduction in torque produced by said engine during shifting to reduce shift shock;

means for monitoring outputs of said sensors and for determining a presence of a malfunction therein; and means for inhibiting generation of said torque variation signal during a shift in the presence of said malfunction.

4. In a power train, the arrangement comprising:

an engine;

an engine speed sensor;

an engine load sensor;

an engine control unit, said engine control unit being connected with said engine speed sensor and said engine load sensor and arranged to control torque produced by said engine;

a transmission operatively connected to said engine, said transmission having an input shaft and an output shaft, said transmission including a source of line pressure and a plurality of friction elements which can be induced to engage via a selective supply of line pressure thereto in a manner to produce a plurality of different gear ratios, and a control valve assembly, said control valve assembly including a valve which controls a level of said line pressure which is supplied to said friction elements;

a transmission output shaft rotational speed sensor for sensing a rotational speed of said transmission; and a transmission control unit, said transmission control unit being connected with said transmission output shaft rotational speed sensor and said engine load sensor, said transmission control unit including means for generating an engine torque variation signal and supplying said engine torque variation signal to said engine control unit, a memory in which line pressure control data is pre-stored, said control data including a first line pressure schedule for use when said torque variation signal is generated and a second line pressure control schedule for use when said torque variation signal is absent, means for monitoring outputs of said engine speed load sensor and said transmission output shaft rotational speed sensor and for diagnosing a sensor malfunction, and means for inhibiting generation of said torque variation signal when said monitoring means indicates a sensor malfunction has occurred.

* * * * *